Dec. 4, 1928.                   1,694,291
P. T. SYWERT
GASKET
Filed Aug. 12, 1927
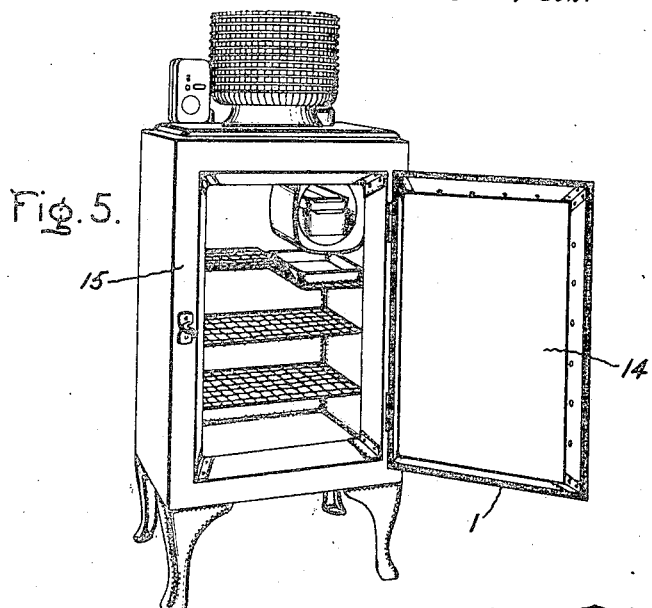
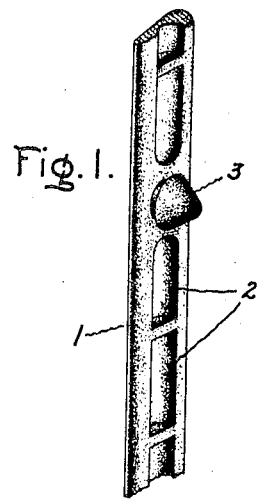
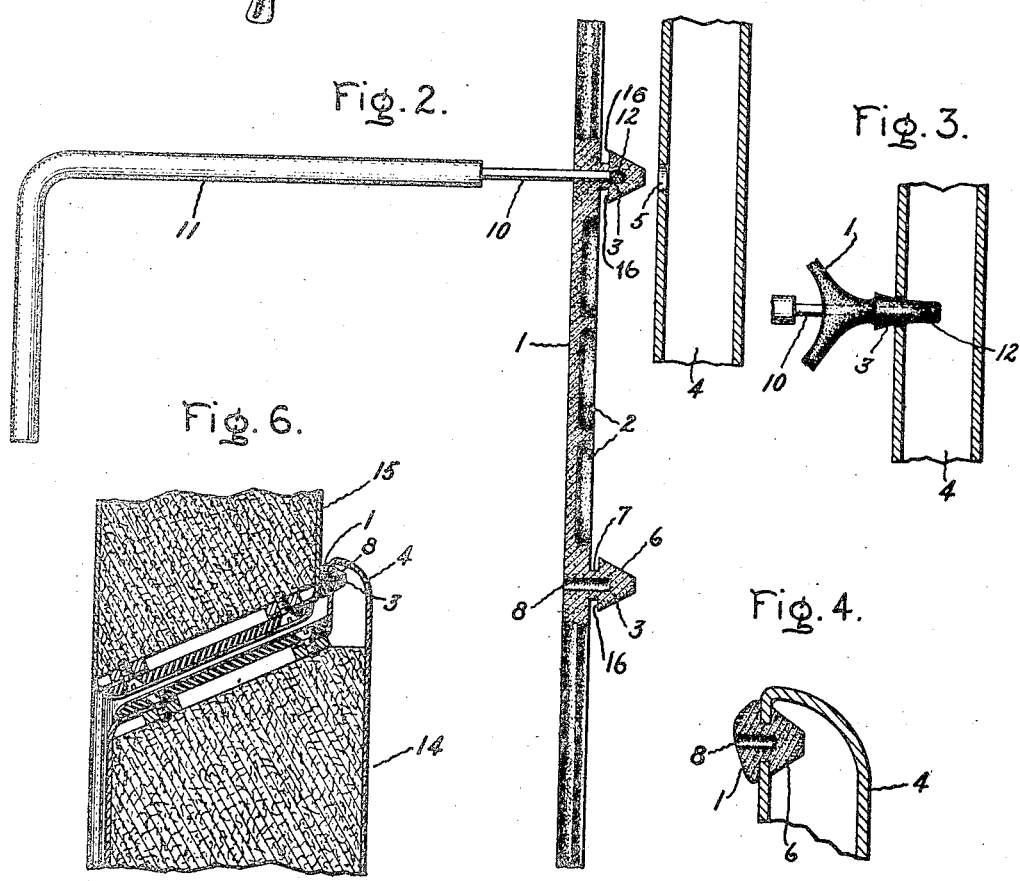
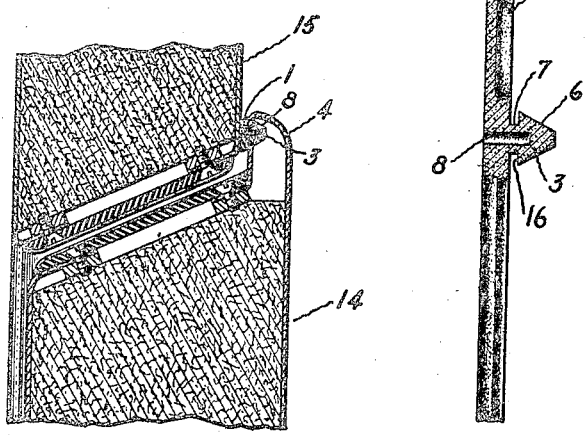
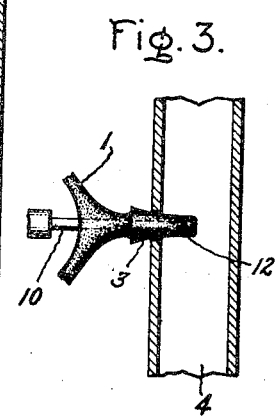
Inventor:
Philip T. Sywert,
by *Alexander S. [signature]*
His Attorney.

Patented Dec. 4, 1928.

1,694,291

UNITED STATES PATENT OFFICE.

PHILIP T. SYWERT, OF SCOTIA, NEW YORK, ASSIGNOR TO GENERAL ELECTRIC COMPANY, A CORPORATION OF NEW YORK.

GASKET.

Application filed August 12, 1927. Serial No. 212,596.

My invention relates to gaskets and particularly to gaskets having projecting portions by which they are secured to a supporting member. An object of my invention is the provision of an improved gasket whose construction facilitates the ease and rapidity with which it may be applied to the supporting member.

My invention will be better understood from the following description taken in connection with the accompanying drawing, and its scope will be pointed out in the appended claims.

Referring to the drawing Fig. 1 is a perspective view of a portion of a gasket embodying my invention; Fig. 2 is a side view of the gasket partly in section showing it about to be applied to a supporting member; Fig. 3 is similar to Fig. 2 but showing the gasket being applied to the member; Fig. 4 is a transverse section of the gasket completely applied to the supporting member; Fig. 5 shows a domestic refrigerating machine the door of which is equipped with gaskets involving my invention; and Fig. 6 is a transverse section through a portion of the refrigerator and door drawn to a larger scale.

In the drawing the gasket 1 is shown in the form of a strip the body portion of which is somewhat triangular in cross section and is provided on the rear side with cutaway portions 2 to save material and to render the gasket more easily compressible. Spaced along the rear face of the gasket are the integral or unitary headed attaching parts or projecting portions 3 by which the gasket is secured to its support. In the application which I have chosen for illustration the gasket is supported by a plate of non-elastic material as for example by a sheet metal member 4 which constitutes a part of the door of a refrigerator and which has spaced perforations or holes 5 therein for receiving the projections 3. The gasket preferably is constructed of a resilient material such as rubber and the spacing of the projections thereon preferably is slightly less than the spacing of the corresponding perforations in the supporting member whereby the resulting slight stretching of the gasket assists in making it lie flat and trim. The projections are shown each having a conical head 6 the base of which is materially larger in diameter than the perforations, a neck 7 of substantially the same diameter as the perforations and flat rear faces 16.

In order to be able to force the heads of the projections easily and quickly through the perforations, I form the gasket with the opening 8 at each projection 3 which opening extends from the front face of the gasket through the body portion thereof and through the neck into the head where it terminates. It is a simple matter to force the head of a gasket so formed into a perforation 5 by the use of a small rod such, for example, as that shown at 10 which is adapted to fit into the hole 8. For convenience in operating the rod I have shown it having an enlarged portion 11 which is bent at right angles to form a handle. By applying pressure on the rod the projection 3 is greatly distorted in shape, the head and neck being elongated with a resulting diminution in diameter in the manner illustrated by Fig. 3. As so distorted the base portion of the cone-shaped head in addition to being of reduced diameter is drawn through the perforation by the rod rather than being pushed through it. After the head has passed through the perforation the rod is removed the gasket resuming its original shape firmly secured to the supporting member as shown by Fig. 4. In order that the gasket may be turned slightly if necessary to make it lie straight I have provided the rod 10 with a slight enlargement 12 on the end which is knurled.

In Figs. 5 and 6 I have shown the gasket 1 applied to the closure of a refrigerator. It is applied to the edge of the refrigerator door 14 to engage and make a tight seal with the face of the refrigerator 15. The gasket in this case preferably is in four strips one for each edge of the door, the corners being mitered.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. A gasket adapted to be applied to a member having a perforation therein, said gasket having a portion larger than the perforation and adapted to be received thereby and having an opening extending incompletely through said portion whereby the gasket may be applied to the member by inserting a member in the opening in the gasket and forcing said portion into the perforation in the member.

2. A gasket adapted to be applied to a member having a perforation therein, said gasket having a body portion and a securing portion, said securing portion being larger than said perforation, said gasket having an opening extending through said body portion and partially through said securing portion whereby said securing portion is adapted to be forced through said perforation by a member inserted in said opening.

3. A gasket adapted to be applied to a member having a perforation therein, said gasket having a body portion and having an integral head portion larger than the perforation and adapted to be passed therethrough, said gasket having an opening extending through the body portion and terminating in the head portion, whereby the head portion may be forced through the perforation in the member by a member inserted in said opening and the gasket thereby secured to the member.

4. A gasket adapted to be applied to a member having a series of perforations therein, said gasket comprising a strip having a series of projecting portions larger than said perforations for securing the gasket to the member, said strip having openings therethrough, each extending into and terminating in a projecting position.

5. A gasket adapted to be applied to a member having a series of perforations therein, said gasket comprising a strip having a series of securing portions projecting from one side thereof, each of said portions comprising a head of greater diameter than that of the perforations in said member and a connecting neck, said strip having an opening for each of said portions extending through the strip and the neck and terminating in the head.

6. A gasket adapted to be applied to a member having a series of spaced perforations therein, said gasket comprising a strip having a series of securing portions projecting from one side thereof and spaced less than said perforations, each of said portions comprising a conical head having a diameter at the base greater than the diameter of said perforations and a neck connecting the head with the strip, said strip having an opening for each of said portions extending through the strip and the neck and terminating within the head.

7. The herein described method of making a tight seal by attaching rubber articles to plates of non-elastic material which consists in providing such plate with a plurality of openings, and said rubber article with a plurality of headed attaching parts, and securing the rubber article to the plate by inserting the headed projections through said openings.

8. A refrigerator comprising a stationary member and a movable member, one of said members having spaced apart holes, and a rubber article having unitary headed rubber attaching means passed through said holes and held in place by the headed portions overlying the edges of the holes in order to make a tight seal between said members.

9. The herein described method of making a tight seal by attaching rubber gaskets to sheet metal which consists in providing such sheet metal with a plurality of openings, securing to the surface of the gasket a plurality of headed attaching parts spaced apart a distance approximating the distance between the holes, and inserting the attaching members through the holes.

10. The herein described method of making a tight seal by attaching rubber gaskets to a sheet metal carrying plate which consists in providing said plate with a plurality of holes, providing a deformable gasket including a gasket strip part and integral attaching parts, and inserting the attaching parts in said holes by deformation of one or more of said parts.

11. In combination, a carrying plate having spaced apart holes, and a rubber gasket having integral rubber attaching means adapted to pass through said holes and having heads with flat rear faces and a connecting neck, said flat rear faces adapted to engage the rear face of said plate.

12. A refrigerator, a closure therefor, a rubber gasket on one member of said closure having unitary headed attaching projections with flat rear faces and a connecting neck.

In witness whereof, I have hereunto set my hand this 11th day of August, 1927.

PHILIP T. SYWERT.